United States Patent [19]

Kinnan

[11] Patent Number: 4,886,939
[45] Date of Patent: Dec. 12, 1989

[54] CABLE SEALING DEVICE AND METHOD

[75] Inventor: Frank R. Kinnan, Camas Valley, Oreg.

[73] Assignee: Conductron Corporation, Milford, N.H.

[21] Appl. No.: 241,064

[22] Filed: Sep. 6, 1988

[51] Int. Cl.$^4$ ............................................ H02G 15/08
[52] U.S. Cl. .................................. 174/77 R; 138/89; 174/99 R
[58] Field of Search .................. 174/77 R, 99 R, 100; 138/89; 277/1

[56] References Cited

U.S. PATENT DOCUMENTS

| | | | |
|---|---|---|---|
| 1,851,939 | 3/1932 | Williams | 174/99 R |
| 3,655,907 | 4/1972 | Philibert et al. | 174/77 R |
| 3,667,640 | 6/1972 | Morrow | 138/89 X |
| 3,964,754 | 6/1976 | Murai et al. | 138/89 X |
| 4,267,401 | 5/1981 | Wilkinson | 174/77 R |
| 4,328,972 | 5/1982 | Albertson et al. | 277/1 |
| 4,622,436 | 11/1986 | Kinnan | 174/77 R |

FOREIGN PATENT DOCUMENTS 2805059 8/1978 Fed. Rep. of Germany .... 174/77 R
760959 11/1956 United Kingdom ............ 174/77 R Primary Examiner—Morris H. Nimmo
Attorney, Agent, or Firm—David Teschner

[57] ABSTRACT

The invention deals with a device and method of using such device to seal the duct about an elongate object such as a pipe or cable extending therethrough into a sewer, cable vault or the like. The device consists of two or more collars of a conforming and compressible material, such as sponge rubber, in a cylindrical shape and having a reinforcing nylon tube extending axially therethrough. Each collar is formed about the elongate object and placed within the duct. Compression bands are placed about the collars to compress them in the direction of the elongate object and expand them each in planes perpendicular thereto to more completely engage the outer surface of the elongate object and the inner surface of the duct. A compliant sealing material may be placed upon one interior face of one of the collars to be spread and extruded beyond the collar periphery to better seal to the elongate object and duct. Multiple collars and sealant layers may be used to improve the seal which is the same text but presented as a single paragraph.

16 Claims, 4 Drawing Sheets

CABLE SEALING DEVICE AND METHOD

BACKGROUND OF THE INVENTION

1. Field of the Invention

The invention pertains to the sealing of ducts through which pipes, cables, tubes or the like pass at the point where such elongate objects pass from such ducts into sewers, cable vaults, etc., to prevent the entry of water, gases, debris or other foreign objects from such ducts into such sewers, cable vaults, etc.

2. Description of the Prior Art

Duct seals commonly found in the prior art are sized to fit into a preset range of duct sizes and provide a set range of pipe, cable, etc., openings. Many seals are configured to handle multiple pipes, cables, etc., so that a seal can be placed about each pipe or cable, etc., passing therethrough. The outside diameter of the seal exceeds the inside diameter of the duct so that the seal is slightly compressed as it is installed. Also the pipe, cable, etc., apertures are slightly undersized to be expanded by the pipe or cable and thus tightly seal thereabout. To provide the needed ranges of duct size, pipe or cable number, etc., requires that a large number of seals be available.

To decrease the number of seal sizes which must be inventoried, a seal or plug assembly 10 as is shown in U.S. Pat. No. 4,622,436 issued Nov. 11, 1986, and owned by the assignee of the instant invention, may be employed. Two or more ring members 18, 24 are sandwiched between compression members 36, 38 operated by biasing means 52, 54. The plug assembly 10 is positioned in a conduit 14 and the cables 12b, 12c and 12a are passed through corresponding apertures 18a, 18b, 18c and 24a, 24b, 24c (see FIG. 2 of the patent). The plug ring members 18, 24 are then expanded by compression members 36, 38 to grip the cables 12a, 12b, 12c and the inner surface of conduit 14. Despite the fact that the expansion of the ring members 18 and 24 permits each size of plug assembly 10 to cover a greater range of duct/cable size, the need for the rigid compression members 36 and 38 limits the applicability of the device especially where the pipe or cable, etc., is of a diameter close to the inside diameter of the duct.

SUMMARY OF THE INVENTION

The present invention overcomes the difficulties present in prior art devices by providing a sealing device and method by which a pipe, cable or other elongate object can be sealed in a duct to prevent the movement of debris, dirt, moisture, gases or other environmental contaminants through the duct and into the sewer, cable vault or other structure where the duct terminates but the pipe, cable, etc., must enter. The present invention finds particular advantage where a single pipe, cable or other object of an outside diameter close to that of the duct inside diameter is involved.

The invention employs two or more collars of reinforced, conforming and compressible materials which can be cut as needed to size and which can be jammed between the outer surface of the elongate object and the inner surface of the duct to at least partially seal such interspace. A compression means, also cut to size as needed, encircles the collars and when operated compresses the collars in a direction along the length of the longitudinal axis of such elongate object and expands them each in a plane perpendicular to such longitudinal axis to more tightly grip the outside surface of the elongate object and the inner surface of the duct to more completely establish the seal. A compliant sealant, as is also described in the cited U.S. Pat. No. 4,622,436, can be placed on one or more of the collars to be spread and extruded out from the collars as the compression means is operated to fill in any remaining voids. It is an object of this invention to provide a novel duct seal.

It is another object of this invention to provide a novel seal for an elongate object in a duct requiring a minimum number of preformed parts.

It is an object of this invention to provide a seal for an elongate object in a duct using two or more compressible, conforming reinforced collars.

It is another object of this invention to provide a seal for an elongate object in a duct using two or more compressible, conforming reinforced collars arranged to be compressed after placement.

It is yet another object of this invention to provide a seal for an elongate object in a duct using two or more compressible, conforming reinforced collars and a compliant sealant arranged to be operated and positioned by external compression means after the collars are in position.

It is still another object of the invention to provide a kit of parts from which compressible, conforming reinforced collars can be formed, compression means can be formed and which contains a sealant.

It is another object of the invention to teach the method of sealing an elongate object in the duct through which it passes by the use of two or more compressible, conforming reinforced collars arranged to be compressed after placement and a compliant sealant positioned to fill remaining voids as the collars are compressed.

Other objects and features of the invention will be pointed out in the following description and claims and illustrated in the accompanying drawings which disclose, by way of example, the principles of the invention and the best mode which has been contemplated for carrying them out.

BRIEF DESCRIPTION OF THE DRAWING

In the drawing in which similar elements are given similar reference characters.

DESCRIPTION OF THE PREFERRED EMBODIMENTS

Figure 1:
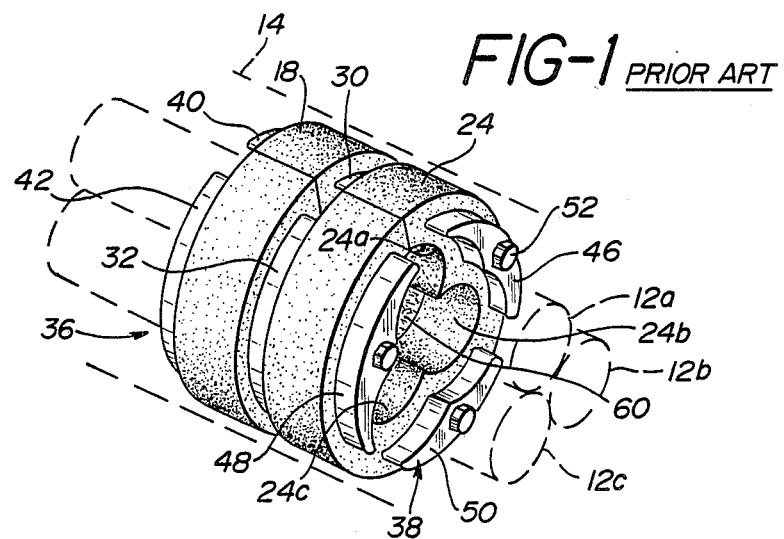
FIGS. 1 and 2 are representative of prior art devices and are FIGS. 3 and 1, respectively, of previously identified U.S. Pat. No. 4,622,436 issed Nov. 11, 1986 in the name of Frank R. Kinnan and entitled "Plug Assembly and Method for Encapsulating a Cable Within a Conduit."
Figure 2:
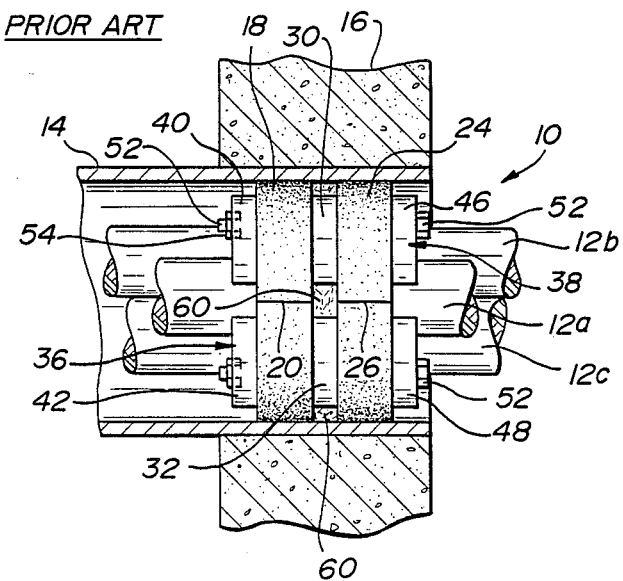
Figure 3:
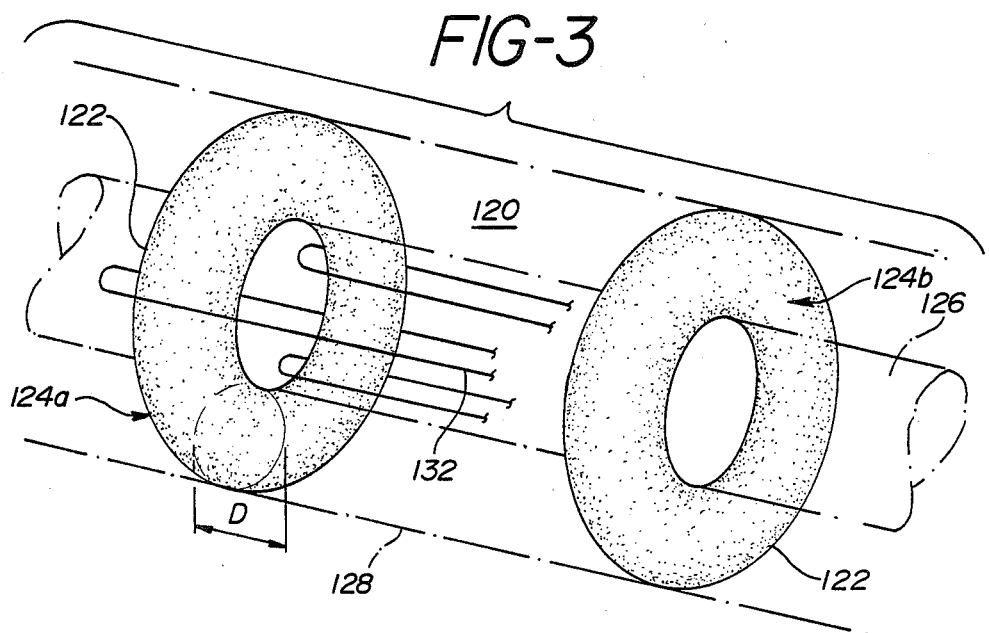
FIG. 3 is an exploded, perspective view of one embodiment of a seal constructed in accordance with the concepts of the invention.

FIGS. 1 and 2 show a prior art duct seal or plug 10 used to seal a conduit 14 about three conductors 12a, 12b and 12c passing therethrough and into a cable vault (not shown). Ring members 18 and 24 are manipulated by the fasteners 52, 54 via compressing members 36, 38 to grip the surfaces of the conductors and conduit in the region of the ring members 18 and 24. Sufficient clearance must exist for the rigid members 40, 42 and 44 (not shown) as well as 46, 48 and 50 to move freely in the interspace between conductors 12a, 12b and 12c and conduit 14 thus limiting the size of the conductors 12a, 12b and 12c.

Turning now to FIGS. 3 to 9, there is shown a sealing device 120 constructed in accordance with the invention and a method which does not suffer from the types of constraints imposed by the prior art. A length of conforming and compressible material 122, such as sponge rubber in a generally rectangular or cylindrical shape, sufficiently long to completely encircle the external surface of the elongate object (as with collar 24) is provided. The width or diameter "D" of the material 122 is greater than the space "S" (see FIG. 6) between the outer surface "O" of the elongate object or conductor 126 and the inner surface "I" of the duct 128.

Figure 5:
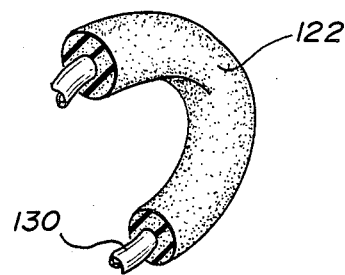
FIG. 5 is a fragmentary view of a collar employed in the seal of the instant invention.

As will be described below, the binding straps that are manipulated to compress the collars 124a, 124b and 124c may be lengths of wire which when pulled tight could cut through material 122 leading to the failure of sealing device 120. To prevent this and provide some rigidity and form to the collars 124a, 124b and 124c and to assist in the desired tensioning and compression, a reinforcing member is added to the material 122 of collars 124a, 124b and 124c. This reinforcing member may take the form of a nylon tube 130 as is shown in FIG. 5 or a solid rod of suitable material or may be square, diamond-shaped or otherwise in cross section. The reinforcement member must be of such shape, size, strength, material, etc., such that it will permit flexing compression, expansion and movement of collars 124a, 124b and 124c while preventing its destruction by the binding straps.

Figure 10:
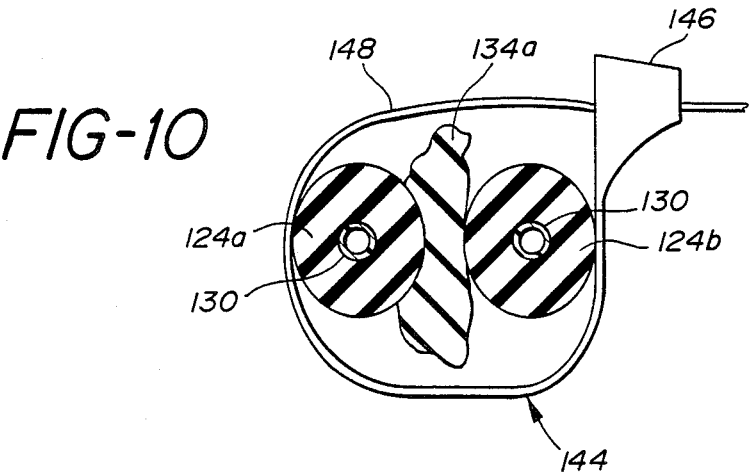
FIG. 10 is a fragmentary, side elevation of two seal collars within a bundling strap compression band.

The binding straps 132 are bands or wires of metal which can be used to compress collars 124a, 124b and 124c and be deformed so as to hold the compressed condition collars 124a, 124b and 124c as desired. Additionally, the binding straps 132 or compression bands could be string or waxed lacing cord, suitably tied and knotted, or plastic bundling straps with locking means as shown in FIG. 10. Plastic bundling strap 144 has a head 146 with a locking pawl therein (not shown), as is well known in the electrical harness-making art, a strap body 148 with teeth thereon to be locked by the pawl. After strap body 148 is passed about collars 124a and 124b, the body 148 enters into an aperture (not shown) in head 146 where the pawl engages the teeth to lock the strap 144. The strap 144 can continue to be tightened, but must be cut to be removed.

Figure 6:
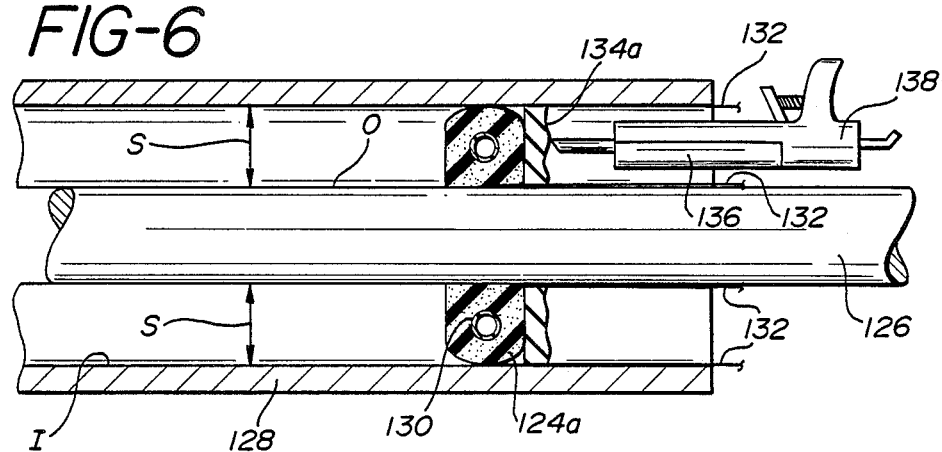
FIG. 6 is a side elevation, partially in section, of an elongate object in a duct with the seal of the instant invention being installed.
Figure 9:
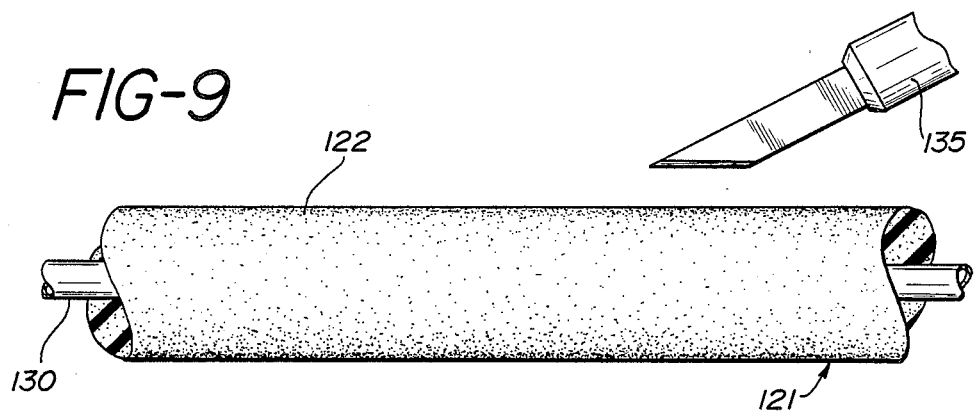
FIG. 9 is a fragmentary, side elevation of the collar stock showing that it can be cut to desired lengths.

Turning now to FIG. 6, the end section of a duct 128 is shown. Extending through duct 128 and into the cable vault is a cable 126. A length of material 122 is cut from a supply suitable material 121 with a knife 135 as shown in FIG. 9. The length will be sufficient to totally encircle the periphery of cable 126. The length of material 122 will be formed into a closed loop or collar 124a about the outer surface "O" of the cable 126 adjacent the entrance to duct 128. It will be moved further into the duct 128 by the installer first using his fingers (not shown) and then a non-metallic tool such as a wooden push stick or rod (not shown). Collar 124a will be inserted far enough into the duct 128 to permit the other collars and seals, to be employed, to also be positioned within the duct 128 with the end face of the last collar employed, flush with the duct 128 end face.

Once in place, a bead of a compliant sealant 134a may be placed upon the outwardly-directed face of collar 124a from a cartridge 136 in a suitable tool 138. The sealant 134a can be an RTV rubber or room-temperature-vulcanizing rubber if it is desired to establish a permanent bond between the cable, seal and conduit or it can be one which remains pliable so tha the seal can be removed and the parts used again or the sealant completely omitted and the seal achieved by the peripheral engagement between the collar 124a, the outside surface "O" of the cable 126 and the inside surface "I" of the duct 128 also permitting reuse of the parts.

The binding strap 132, initially placed about two or more locations and about the torroidal diameters D of the collar 124a, are brought out the end of duct 128, one end adjacent the inner surface "I" of duct 128 and the other end adjacent outer surfce "O" of the cable 126. A second collar 124b of material 122, cut from supply 121 of suitable material (see FIG. 9), is also formed up about cable 126 in a manner similar to collar 124a and placed inside the binding straps 132. As is shown, three sets of binding straps 132 are normally employed, placed equidistantly about the periphery of the collars 124a and 124b. The number of binding straps 132 could be decreased to two or increased to four or five or more depending upon the collar size.

Figure 7:
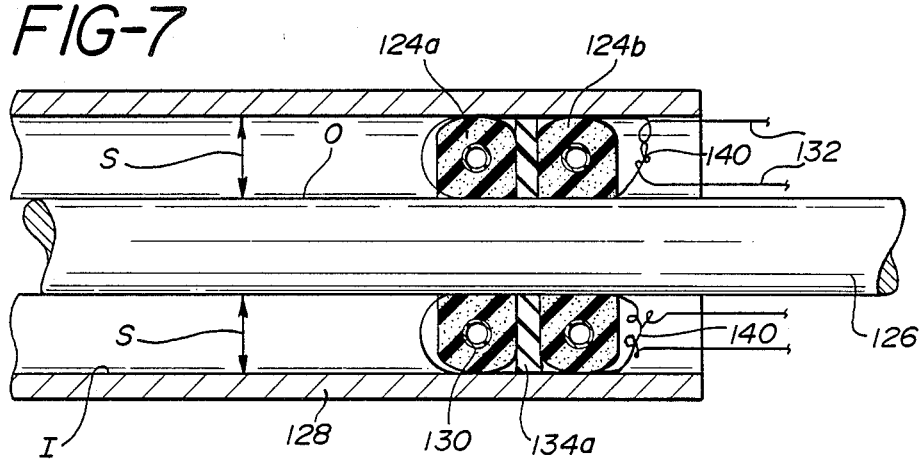
FIG. 7 is the same as FIG. 6 showing a further stage in the installation of the seal.

The second collar 24b is advanced into the duct 128 until it takes up a position adjacent collar 124a and sealant 134a as is shown in FIG. 7. In the event that only two collars 124a and 124b were to be used, the exposed face of collar 124b would be adjacent the end of duct 128. Two collars 124a and 124b may be sufficient where the duct diameter is small and/or where the space "S" is narrow. The second collar 124b also fits within the binding straps 132. The binding straps 132 are pulled upon to draw the collars 124a and 124b into intimate contact and to compress the collars 124a and 124b along the length or longitudinal axis of cable 126 and the compressing action causes the bead of sealant 134a to spread over the confronting faces of the collars 124a and 124b and extrude beyond the collar edges to engage the outer surface "O" of cable 126 and the inner surface "I" of duct 128. The collars 124a and 124b also expand along planes perpendicular to the longitudinal axis of cable 126 to more fully engage the outer surface "O" of cable 126 and inner surface "I" of duct 128. The binding straps 132 may now be twisted as at 140 to maintain the condition of collars 124a and 124b.

Figure 4:
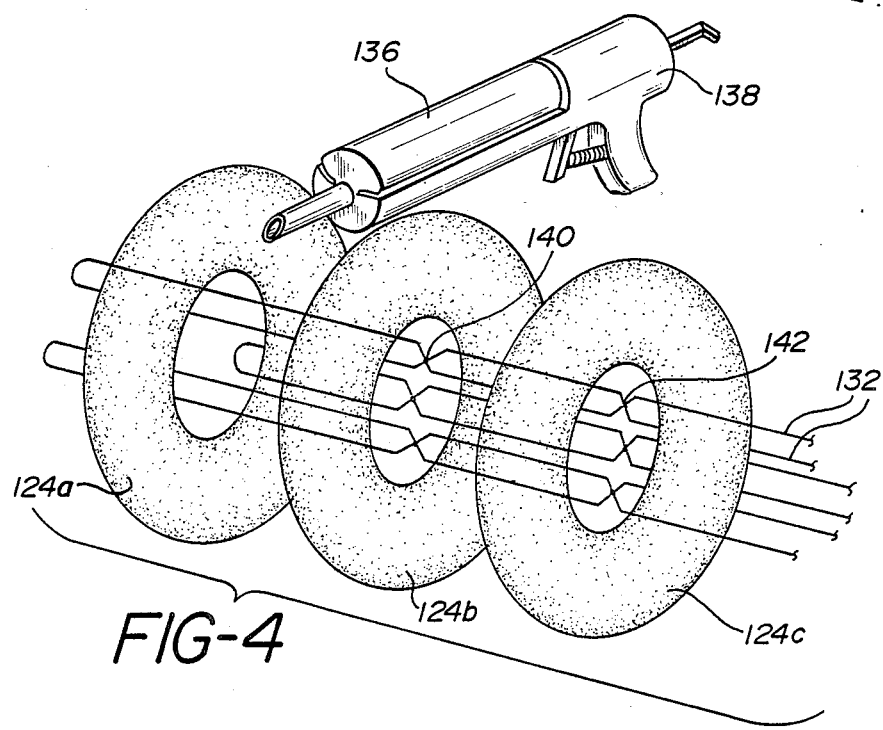
FIG. 4 is an exploded, perspective view of a second embodiment of a seal constructed in accordance with the concepts of the invention.
Figure 8:
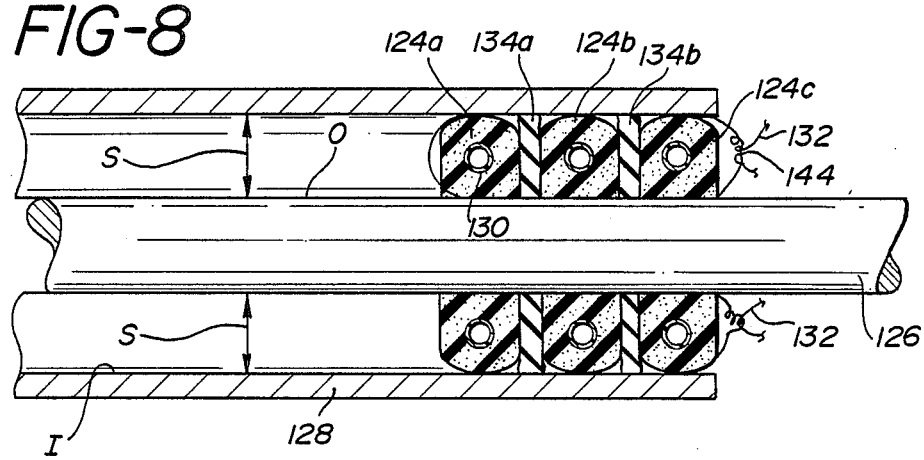
FIG. 8 is the same as FIG. 6 showing the completed seal according to the concepts of the invention.

For arrangements where the spacing "S" is large or where additional seal strength or integrity is desired a third collar 24c will be employed as is shown in FIGS. 4 and 8. A second bead of sealant 34b is placed on the exterior facing surface of collar 24b and the third collar 24c is inserted into the space "S" between the inner surface "I" of duct 28 and the outer surface "O" of cable 126 so that its exterior facing surface abuts the end of duct 126. The binding straps 132 may be twisted as at 140 after the collars 124a and 124b are in place and a new twist 142 added after collar 124c is in place so that the condition of collars 24a and 24b can be maintained independent of collar 24c or the straps 132 can be twisted as at 144 in FIG. 8 only after all three collars 124a, 124b and 124c are in place.

In addition to providing a seal for the cable 126 and the duct 28, the collars 24a, 24b and 24c serve to position the cable 126 in the duct 128, support the cable 126 and prevent its contact with the rough edge of the duct 128 or the cable vault wall (not shown) which could injure the cable insulation and perhaps short the cable.

While there have been shown and described and pointed out the fundamental novel features of the invention as applied to the preferred embodiments, it will be understood that various omissions and substitutions and changes of the form and details of the devices illustrated and in their operation may be made by those skilled in the art, without departing from the spirit of the invention.

The embodiments of the invention in which an exclusive property or privilege is claimed are defined as follows:

1. A sealing kit having component parts therein capable of being utilized in the field to seal the duct about an elongate object extending therethrough, and kit comprising:
    (a) a first predetermined length of reinforced, conforming and compressible material to be cut into one or more lengths, each less than said first predetermined length, for placement about an elongate object within said duct;
    (b) a second predetermined length of wire binding material to be cut into one or more lengths, each less than said second predetermined length, for placement about each of said lengths of reinforced, conforming and compressible material when positioned about said elongate object within said duct for compressing said compressible material lengths when twisted to fasten said wire binding material; and
    (c) a sealing compound for placement upon the compressible material lengths to fill the space between said material and said duct and said elongate object when said lengths of compressible material are compressed by the twisting to fasten of said wire binding material.

2. A sealing kit having component parts therein capable of being utilized in the field to seal the duct about an elongate object extending therethrough, said kit comprising:
    (a) a predetermined length of reinforced, conforming and compressible material to be cut into one or more lengths, each less than said predetermined length, for placement about said elongate object within said duct;
    (b) a plurality of bundling straps each having a body portion and a locking head portion by which the body portion may be looped about each of said lengths of reinforced, conforming the compressible material when positioned about said elongate object within said duct, drawn into the locking head portion and said loop reduced in size for compressing said compressible material lengths when fastened; and
    (c) a sealing compound for placement upon the compressible material lengths to fill the space between said material and said duct and said elongate object when said lengths of compressible material are compressed by the fastening of said binding material.

3. A seal for sealing a duct about an elongate object extending therethrough comprising a first collar of reinforced, conforming and compressible material adapted to be placed about said elongate object and in contact with at least a portion of the inner surface of said duct to substantially fill such interspace;
    at least a second collar of reinforced, conforming and compressible material adapted to be placed about said elongate object and in contact with at least a portion of the inner surface of said duct to substantially fill such interspace; and
    a plurality of elongate compression means, each wrapped about said first and said second collars which when manipulated cause said first and second collars when installed to compress in a direction along the length of said elongate object while each expands in a plane perpendicular to the length of said elongate object to increase the contact between said first and said second collars and the inner surface of said duct and the outer surface of said elongate object to substantially seal the duct about said elongate object adjacent said first and second collars.

4. A seal as defined in claim 3, wherein said first and second collars are cylindrical in cross-section.

5. A seal as defined in claim 3, wherein said first and second collars are rectangular in cross-section.

6. A seal as defined in claim 3, wherein said first and second collars are each made of sponge rubber and reinforcement is provided by a nylon tube extending axially through each of said first and second collars.

7. A seal as defined in claim 3, wherein said elongate compression means are lengths of wire which are twisted together to compress said first and second collars.

8. A seal as defined in claim 3, wherein said elongate compression means are lengths of string which are tied together to compress said first ands second collars.

9. A seal as defined in claim 3, wherein said elongate compression means are bundling straps tightly looped about said first and second collars to compress same.

10. A seal as defined in claim 3, further comprising a compliant sealant material in the form of a bead placed on the face of said first collar adjacent the end of said duct; said bead arranged to be engaged by the confronting face of said second collar and extruded and spread by the compresion of said first and second collars over the confronting faces and into contact with the inner surface of said duct and the outer surface of said elongate object to further increase the seal between said elongate object and said duct.

11. A seal as defined in claim 3, further comprising a third collar of reinforced, conforming and compressible material adapated to be placed about said elongate object and in contact with at least a portion of the inner surface of said duct and within said compressing means; the manipulation of said compression means compressing said first, second and third collars in a direction along the length of said elongate object while expanding same, each in a plane perpendicular to the length of said elongate object to increase the contact between said first, second and third collars and the inner surface of said duct and the outer surface of said elongate object to substantially seal the duct about said elongate object adjacent said first, second and third collars.

12. A seal as defined in claim 11, comprising two beads of compliant sealant material, one of each of said beads placed on the duct end facing faces of said first and second collar, one of said beads arranged to be engaged by each of the confronting faces of said first and third collars and extruded and spread by the compression of said first, second and third collars over the confronting faces and into contact with the inner surface of said duct and the outer surface of said elongate object to further increaes the seal between said elongate object and said duct.

13. A seal as defined in claim 1, wherein each of said first, second and third collars is comprised of sponge rubber and is cylindrical in shape and is reinforced by a nylon tube extending axially through each of said first, second and third collars.

14. A seal as defined in claim 1, wherein said elongate compression means are lengths of wire which are twisted together to compress said first, second and third collars.

15. A seal as defined in claim 11 wherein said elongate compression means are lengths of string which are tied together to compress said first, second and third collars.

16. A seal as defined in claim 11, wherein said elongate compression means are bundling straps tightly looped about said first, second and third collars to compress same.

* * * * *